US008641286B2

(12) United States Patent
Long et al.

(10) Patent No.: US 8,641,286 B2
(45) Date of Patent: Feb. 4, 2014

(54) COMPOSITE BEARING MEMBER, MANUFACTURING METHOD OF COMPOSITE BEARING MEMBER, BEARING DEVICE AND ROTARY ELECTRICAL MACHINE

(75) Inventors: Than Trong Long, Yokohama (JP); Yuuji Hisazato, Fuchu (JP); Satoshi Namba, Yokohama (JP); Kazuma Mukai, Higashimurayama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1113 days.

(21) Appl. No.: 12/621,032

(22) Filed: Nov. 18, 2009

(65) Prior Publication Data

US 2010/0124388 A1 May 20, 2010

(30) Foreign Application Priority Data

Nov. 19, 2008 (JP) ................................ P2008-295184

(51) Int. Cl.
*F16C 33/02* (2006.01)
*F16C 33/20* (2006.01)
*B22F 7/00* (2006.01)

(52) U.S. Cl.
USPC ............................ 384/276; 384/297; 428/547

(58) Field of Classification Search
USPC ......... 384/276, 279, 280, 282, 286, 297, 299, 384/300, 129; 428/551, 615–619, 621–624, 428/626, 547, 610
See application file for complete search history.

(56) References Cited

U.S. PATENT DOCUMENTS

| 4,732,818 | A  | * | 3/1988  | Pratt et al. ..................... 428/547 |
| 5,601,371 | A  | * | 2/1997  | Koroschetz et al. .......... 384/276 |
| 6,416,846 | B2 |   | 7/2002  | Long |
| 6,863,994 | B2 | * | 3/2005  | Tanaka et al. ................. 428/626 |
| 2002/0015839 | A1 | * | 2/2002  | Niwa et al. .................... 428/325 |
| 2004/0115465 | A1 | * | 6/2004  | Bickle et al. .................. 428/626 |
| 2007/0269674 | A1 | * | 11/2007 | Yanase et al. ................. 428/550 |

FOREIGN PATENT DOCUMENTS

| EP | 265937 A2 * | 5/1988 | ............. C23C 14/06 |
| EP | 0 808 711 B1 | 11/1997 | |

(Continued)

OTHER PUBLICATIONS

Notice of Reasons for Refusal ("Notice") issued by the Japanese Patent Office on Apr. 9, 2013, in counterpart Japanese Patent Application No. JP2008-295184.

(Continued)

*Primary Examiner* — Phillip A Johnson
(74) *Attorney, Agent, or Firm* — Finnegan, Henderson, Farabow, Garrett & Dunner, L.L.P.

(57) ABSTRACT

A composite bearing member 10 includes: a bearing sliding material 20 whose surface contacts a rotating portion; a bearing base material 30 made of a material different from a material constituting the bearing sliding material 20; and a joining layer 40 joining the bearing sliding material 20 and the bearing base material 30. Further, the bearing sliding material 20 has a sliding layer 50 sliding the rotating portion on a surface. Furthermore, the bearing sliding material 20 has, between the sliding layer 50 and the joining layer 40, a composition graded layer 60 which dispersedly contains the same metal material as a metal material constituting the joining layer 40 and in which a content of the metal material is increased toward the joining layer 40.

6 Claims, 11 Drawing Sheets

(56) References Cited

FOREIGN PATENT DOCUMENTS

| EP | 0 808 711 B1 | 8/2002 |
|----|--------------|--------|
| JP | 9-144751 | 6/1997 |
| JP | 10-128521 | 5/1998 |
| JP | 2000-85045 | 3/2000 |
| JP | 2000-356222 | 12/2000 |
| JP | 3194866 | 6/2001 |
| JP | 2002-227842 | 8/2002 |

OTHER PUBLICATIONS

Notice of Reasons for Refusal issued by the Japanese Patent Office on Aug. 7, 2012, for Japanese Patent Application No. 2008-295184, and English-language translation thereof.

Notification of the First Office Action issued by the State Intellectual Property Office of the People's Republic of China on May 18, 2011, in Chinese Application No. 200910225237.9, and English-language translation thereof.

* cited by examiner

COMPOSITE BEARING MEMBER, MANUFACTURING METHOD OF COMPOSITE BEARING MEMBER, BEARING DEVICE AND ROTARY ELECTRICAL MACHINE

CROSS-REFERENCE TO THE RELATED APPLICATIONS

This application is based upon and claims the benefit of priority from the prior Japanese Patent Application No. 2008-295184, filed on Nov. 19, 2008; the entire contents of which are incorporated herein by reference.

BACKGROUND OF THE INVENTION

1. Field of the Invention

The present invention relates to a composite bearing member used for a rotary electrical machine or the like, a manufacturing method of a composite bearing member, a bearing device having this composite bearing member, and a rotary electrical machine having this bearing device.

2. Description of the Related Art

Recently, as industrial technology develops, various kinds of bearings are required to cope with speed-up of a rotary shaft, to have a high surface pressure, and so on. Conventionally, a white metal (for example, type I: Sn 88 to 92 wt %, Sb 5 to 7 wt %, Cu 3 to 5 wt %) has been often used as a bearing material. However, since such a soft metal material has a low fusing point, and has problems of significant deterioration of a strength at a high temperature and of burning, so that its range of use is limited.

A polytetrafluoroethylene (PTFE) resin material has a low friction coefficient and a superior heat resistance, and is suitable as a bearing material. Further, a polyether ether ketone (PEEK) resin material and a polyimide (PI) resin material each have a slightly higher friction coefficient compared with the polytetrafluoroethylene resin material, but is superior in a mechanical property at a high temperature. By addition of various kinds of ceramics fibers or particle filler to the above-described resin materials, a sliding material having both the mechanical property, a friction characteristic and an abrasion characteristic can be produced.

In order to obtain a bearing device whose bearing sliding surface is constituted with the above-described resin material and whose bearing base material is constituted with a metal material, it is necessary to join the resin material and the metal material being heterogeneous materials in a manner to have a sufficient joining strength.

However, in a case that the resin material and the metal material are joined, if a joining method applied to joining of metal materials is adopted, it is difficult to obtain a sufficient joining strength. In other words, in a case that different metal members are joined by a molten metal solidification method, a diffusion reaction or the like is generated since both materials are metals, so that physical joining or chemical joining occurs in addition to mechanical joining. In contrast, in the case that the resin material and the metal material are joined, joining is simple mechanical joining, so that it is difficult to obtain a sufficient joining strength. Further, in a case that the resin material and the metal material are joined under a condition of a high temperature and a high pressure, deterioration of the resin material occurs, or a problem such as a manufacturing cost increase due to long time holding under the condition of the high temperature and the high pressure occurs.

Further, when the resin material and the metal material are to be joined, joining by using an adhesive agent or the like can be considered, but it is difficult to select an adhesive agent having good adhesiveness to both the resin material and the metal material. Further, in a case of a resin-based adhesive agent, since a joining interface between the resin and the metal necessarily exists, a bonding strength between the metal material and the resin material cannot be improved basically.

Further, when two kinds of members are to be joined, as a method to improve an interface strength, there is known a method of increasing a joining area by enlarging a surface area by means of honing, chemical etching or the like, for example. However, enlargement of the joining area by honing, chemical etching or the like is limited and a resistance against shear peeling of the interface is small, and therefore, a joining strength between heterogeneous materials cannot be increased sufficiently.

On the other hand, in consideration of various problems in a conventional bearing material, in JP-B2 3194866 (Patent Registration), for example, technology is suggested in which for joining a resin material and a metal material, a porous intermediate layer is provided on a surface of the metal material, and the resin material is stacked on the metal material while being filled into the porous intermediate layer. According to this invention, the porous intermediate layer is joined to a bearing base material under vacuum in advance.

When a bearing for a hydroelectric generator, for example, is created by using the above-described conventional method of joining the resin material and the metal material, a process for joining under vacuum is extremely expensive since a total weight of a bearing base material is from several hundred kilograms to several tons, and a manufacturing cost is increased. In addition, capacity of a vacuum facility is limited, creation under vacuum may be sometimes difficult.

Under the circumstances, in a bearing material made by joining heterogeneous materials such as a resin material and a metal material, for example, it is considered to be a problem to reduce a manufacturing cost without sacrificing performance or reliability of a bearing and without depending on facility capacity.

BRIEF SUMMARY OF THE INVENTION

Thus, an object of the present invention is to provide a composite bearing member which can be manufactured by a simple method without deteriorating performance and reliability of a bearing member and which has a superior joining strength in a joining portion of heterogeneous materials, a manufacturing method of a composite bearing member, a bearing device including this composite bearing member, and a rotary electric machine including this composite bearing member.

According to an aspect of the present invention, there is provided a composite bearing member including: a bearing sliding material having a sliding layer sliding a rotating portion on one surface; a bearing base material made of a material different from a material constituting the bearing sliding material; and a joining layer joining the other surface of the bearing sliding material and one surface of the bearing base material, wherein a layer constituting the bearing sliding material between the sliding layer and the joining layer is a composition graded layer which dispersedly contains a metal material and in which a content of the metal material is increased toward the joining layer.

Further, according to an aspect of the present invention, there is provided a manufacturing method of a composite bearing member, the manufacturing method including: resin particle layer forming to form a resin particle layer by filling a predetermined amount of resin particles made of resin into a mold having a predetermined shape; mixed particle layer forming to form a plurality of mixed particle layers made of resin particles and metal particles on the resin particle layer by mixing the metal particle made of a first metal material having a fusing point lower than a fuse bonding temperature at which the resin particles are fuse bonded to each other into the resin particle made of resin, with a content of the metal particle being gradually increased; pressing to create a formed body by pressing the resin particle layer and the mixed particle layer which are stacked in a stack direction to unify the layers; resin particle fuse bonding to fuse bond the resin particles by heating the formed body to the fuse bonding temperature; stacking to construct a stacked body by disposing the formed body in a manner that a resin particle side is a downside, stacking a metal member made of a second metal material having a fusing point lower than the fuse bonding temperature on the formed body, and stacking a base material on the metal member; and joining to join the layers of the formed body, and the formed body and the base material by heating the stacked body to a temperature equal to or higher than the fusing points of the first metal material and the second metal material and lower than the fuse bonding temperature to fuse the metal particle and the metal member.

Further, according to an aspect of the present invention, there is provided a manufacturing method of a composite bearing member, the manufacturing method including: resin particle layer forming to form a resin particle layer by filling a predetermined amount of resin particles made of resin into a mold having a predetermined shape; mixed particle layer forming to form a plurality of mixed particle layers made of resin particles and metal particles on the resin particle layer by mixing the metal particle made of a first metal material having a fusing point lower than a fuse bonding temperature at which the resin particles are fuse bonded to each other into the resin particle made of resin, with a content of the metal particle being gradually increased; pressing to create a formed body by pressing the resin particle layer and mixed particle layer which are stacked in a stack direction to unify the layers; pore forming to form pores in the formed body by heating the formed body to the fuse bonding temperature to fuse bond the resin particles to each other and to fuse the metal particle so that the metal particle flows outside the formed body; stacking to construct a stacked body by disposing the formed body in a manner that a resin particle side is a downside, stacking a metal member made of a second metal material having a fusing point lower than the fuse bonding temperature on the formed body, and stacking a base material on the metal member; and joining to impregnate the metal member into the pores and to join the formed body and the base material by heating the stacked body to a temperature equal to or higher than a fusing point of the second metal material and lower than the fuse bonding temperature to fuse the metal member.

Further, according to an aspect of the present invention, there is provided a bearing device including: a thrust bearing slidably supporting a thrust load in a shaft direction of a rotary shaft; and a guide bearing slidably supporting shaft shaking in a rotational direction, wherein at least one of bearing members in the thrust bearing and the guide bearing is constituted with the above described composite bearing member.

Further, according to an aspect of the present invention, a rotary electrical machine including the above-described bearing device is provided.

BRIEF DESCRIPTION OF THE DRAWINGS

The present invention will be described with reference to the drawings, but those drawings are provided only for the purpose of illustration and are not intended to limit the invention in any way.

DETAILED DESCRIPTION OF THE INVENTION

Hereinafter, an embodiment of the present invention will be described with reference to the drawings.

Figure 1:
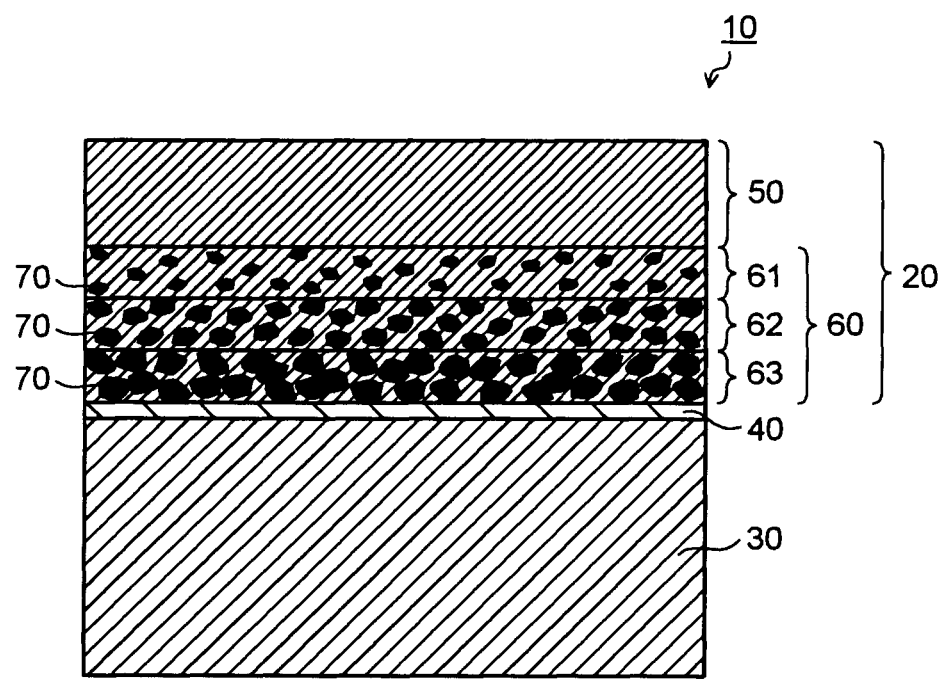
FIG. 1 is a diagram showing a cross section of a composite bearing member of an embodiment according to the present invention.

FIG. 1 is a diagram showing a cross section of a composite bearing member 10 of an embodiment according to the present invention.

As shown in FIG. 1, the composite bearing member 10 has a bearing sliding material 20 whose surface contacts a rotating portion, a bearing base material 30 made of a material different from a material constituting the bearing sliding material 20, and a joining layer 40 joining the bearing sliding material 20 and the bearing base material 30. Further, the bearing sliding material 20 has a sliding layer 50 sliding the rotating portion on its surface. Furthermore, the bearing sliding material 20 has, between the sliding layer 50 and the joining layer 40, a composition graded layer 60 which dispersedly contains a metal material and in which a content of the metal material is increased toward the joining layer 40. Here, there is shown an example of the composition graded layer 60 constituted with three metal material containing layers 61, 62, 63 in which the metal material is contained by different rates, respectively, and is dispersed.

A matrix constituting the bearing sliding material 20 is constituted with a resin material having a fuse bonding temperature higher than a fusing point of a metal material 70 contained in the composition graded layer 60. In other words, part of the composition graded layer 60 other than the metal material and the sliding layer 50 are constituted with that resin material. Here, the fuse bonding temperature means a temperature at which a surface of a resin material is fused and the resin materials become fuse bondable to each other. As the resin material, for example, a polytetrafluoroethylene (PTFE) resin (fuse bonding temperature: 350 to 400° C.), a polyether ether ketone (PEEK) resin (fuse bonding temperature: 300 to 400° C.), a polyimide (PI) resin (fuse bonding temperature: 400 to 500° C.), or the like can be used. As the resin material, a resin-based composite material made by adding a filler such as, for example, a ceramics fiber and a ceramics particle to the above-described resin material can be also used. The polytetrafluoroethylene (PTFE) resin has a small friction coefficient and is superior in a heat resistance. Further, the polyether ether ketone (PEEK) resin and the polyimide (PI) resin have slightly larger friction coefficient compared with the polytetrafluoroethylene (PTFE) resin, but are superior in mechanical properties at a high temperature. Further, the above-described resin-based composite materials are superior in both a friction and abrasion property and a mechanical property.

Meanwhile, the metal material 70 contained in the composition graded layer 60 is constituted with a material whose fusing point is lower than the fuse bonding temperature of the resin material, as described above. As the metal material 70, for example, Sn (fusing point: 232° C.) or an alloy whose main constituent is Sn can be used. As the alloy whose main constituent is Sn, there can be cited, for example, Sn-0.7 wt % Cu (fusing point: 227° C.), Sn-0.5 wt % Cu-0.3 wt % Ag (fusing point: 217° C.) and the like, which are widely used as solder materials and the like.

Here, in the metal material containing layers 61, 62, 63 constituting the composition graded layer 60, the content of the metal material 70 contained therein is increased in order from the metal material containing layer 61 in a sliding layer 50 side toward the metal material containing layer 63 in a joining layer 40 side. In other words, the content of the metal material 70 is larger in order of the metal material containing layer 63, the metal material containing layer 62, and the metal material containing layer 61. Here, the content of the metal material 70 in the metal material containing layer 61 in the sliding layer 50 side is larger than 0 (zero) vol %, while the content of the metal material 70 in the metal material containing layer 63 in the joining layer 40 side is smaller than 100 vol %. For instance, an example can be cited in which the content of the metal material 70 in the metal material containing layer 61 is 10 to 30 vol %, the content of the metal material 70 in the metal material containing layer 62 is 40 to 60 vol %, and the content of the metal material 70 in the metal material containing layer 63 is 70 to 90 vol %. It should be noted that a composition graded layer is not limited to the one constituted with three metal material containing layers, but it suffices that the composition graded layer is constituted with at least two or more metal material containing layers. Further, a content of the metal material 70 contained in each metal material containing layer is not limited to a range of the above-described example, but it suffices that it is constituted in a manner that the content of the contained metal material 70 is increased in order from the metal material containing layer 61 in the sliding layer 50 side to the metal material containing layer 63 in the joining layer 40 side. It should be noted that it is preferable that the content of the metal material 70 is set so as not to vary widely between the neighboring metal material containing layers.

As stated above, the composition graded layer 60 has the metal material containing layer 61 in the sliding layer 50 side, the metal material containing layer 61 having a composition close to that of the sliding layer 50 with a smaller content of the metal material 70, with the content of the metal material 70 being gradually increased as approaching the joining layer 40, and has the metal material containing layer 63 in the joining layer 40 side, the metal material containing layer 63 having a composition close to that of the joining layer 40 with a larger content of the metal material 70. Having such a composition graded layer 60 makes a difference in coefficients of linear expansion between neighboring layers small. Thereby, a thermal stress generated between the neighboring layers is alleviated.

It is preferable that a thickness of the composition graded layer 60 is about 1 mm to 10 mm in order to evade acute change in the contents of the metal material 70 between the neighboring metal material containing layers and to alleviate a thermal stress generated from a difference in the coefficients of linear expansion between the resin material and the metal material 70. For example, when the coefficient of linear expansion of the resin material is about $15 \times 10^{-5}/°$ C., the coefficient of linear expansion of the metal material 70 is about $20 \times 10^{-5}/°$ C., a thickness of the sliding layer 50 is 1 to 10 mm, and a size of the composite bearing member 10 is 500 mm×500 mm, it is preferable that the thickness of the composition graded layer 60 is set to be in a range of 2 mm to 5 mm.

Further, as will be described later, the composition graded layer 60 is constituted with respective materials made of particles, for example, for constituting the resin material or the metal material 70. As those particles, particles with a particle diameter of 10 μm to 100 μm are often used. It is preferable that the thicknesses of the respective metal material containing layers 61, 62, 63 are set to be in a range of 0.5 mm to 1 mm, considering manufacturing variations. On the other hand, the thickness of the sliding layer 50 is accordingly set to be in a range of 1 mm to 10 mm, based on a relation between an abrasion loss and an operating life.

Further, the metal material contained in the metal material containing layers 61, 62, 63 is contained in a state of being dispersed almost uniformly in the respective metal material containing layers 61, 62, 63, as shown in FIG. 1. Besides, the metal material contained dispersedly is constituted in a form such as a particle form or a form of three dimensional lattice shape dispersion, for example. Here, forms of the metal material contained in the respective metal material containing layers 61, 62, 63 can be the same or different. For example, if the metal material has the particle form, average particle diameters of the metal material in the respective metal material containing layers 61, 62, 63 can be the same or different. In other words, it suffices that it is constituted in a manner that the content of the contained metal material 70 is increased in order from the metal material containing layer 61 in the sliding layer 50 side toward the metal material containing layer 63 in the joining layer 40 side, and forms of the metal material contained in the respective metal material containing layers 61, 62, 63 are not limited in particular.

The respective metal material containing layers 61, 62, 63 are joined by fuse bonding of the resin materials, welding of the metal materials, and fuse bonding of the resin material and the metal material. Meanwhile, the sliding layer 50 and the metal material containing layer 61 are joined by fuse bonding of the resin materials and fuse bonding of the resin material and the metal material.

Here, porosity in the sliding layer 50 and the respective metal material containing layers 61, 62, 63 is equal to or less than 0.5 vol %, and the sliding layer 50 and the respective metal material containing layers 61, 62, 63 are in a dense state.

The bearing base material 30 is a structural member having a strength to support a high load which acts on the bearing sliding material 20, and is constituted with a material which is capable of exhibiting a necessary strength under a use condition and which is different from a material constituting the bearing sliding material 20. To the material constituting the bearing base material 30, a material such as an iron-based material, a copper-based material, and an aluminum-based material, for example, can be applied. As the bearing base material 30, it is preferable to use, in particular, an iron-based steel product such as structural carbon steel (S45C).

The joining layer 40 joins the bearing sliding material 20 and the bearing base material 30, and is constituted with a material having a fusing point lower than the fuse bonding temperature of the resin material, similarly to the metal material contained in the above-described metal material containing layers 61, 62, 63. As for the material to form the joining layer 40, the joining layer 40 can be constituted with any one material among the same materials as the metal materials contained in the above-described metal material containing layers 61, 62, 63, for example. In other words, as the material to constitute the joining layer 40, for example, Sn or an alloy whose main constituent is Sn can be used. As an alloy whose main constituent is Sn, for example, Sn-0.7 wt % Cu, Sn-0.5 wt % Cu-3.0 wt % Ag, and the like which are widely used as solder materials can be cited. It should be noted that when a material different from the metal material contained in the above-described metal material containing layers 61, 62. 63 is used as a material to form the joining layer 40, it is preferable to select a material leading to a smaller difference in the coefficients of linear expansion between the respective materials.

Next, a method of manufacturing the composite bearing member 10 will be described.

Here, two methods (first manufacturing method and second manufacturing method) of manufacturing the composite bearing member 10 will be described.

(First Manufacturing Method)

FIG. 2A to FIG. 2E are cross-sectional views showing processes of manufacturing a composite bearing member 10 by the first manufacturing method.

First, a resin particle made of the above-described resin material to constitute a matrix of a bearing sliding material 20 is prepared. It is preferable that an average particle diameter of the resin particle 100 is 0.1 mm to 1 mm, considering an average particle diameter of a granulated particle in a case that the resin particle 100 contains a ceramics fiber or a particle filling material Further, a metal particle 110 made of the above-described metal material 70 to be contained in a composite graded layer 60 is prepared. Here, average particle diameters of the metal particles 110 used for forming respective metal material containing layers 61, 62, 63 can be the same or different. It should be noted that the average particle diameter, here means a median particle diameter. The average particle diameter is measured by, for example, a laser diffraction particle size distribution measuring method or the like.

Subsequently, in order to form the metal material containing layers 61, 62, 63, three kinds of mixed particles (first mixed particle 120, second mixed particle 121, third mixed particle 122) in which the resin particle 100 and the metal particle 110 are uniformly mixed in a predetermined rate are created. Here, the three kinds of mixed particles are created in a manner that a volume content of the metal particle 110 in the first mixed particle 120 is the smallest and a volume content of the metal particle 110 in the third mixed particle 122 is the largest.

Figure 2A:
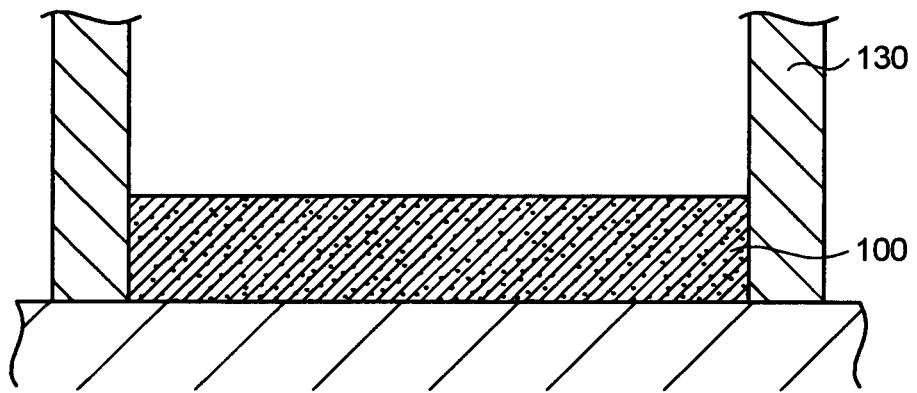
FIG. 2A is a cross-sectional view showing a process of manufacturing a composite bearing member by a first manufacturing method.

First, as shown in FIG. 2A, a predetermined amount of the resin particles 100 to become a sliding layer 50 of the bearing sliding material 20 is filled into a mold 130 of a predetermined shape which is set on a flat surface.

Figure 2B:
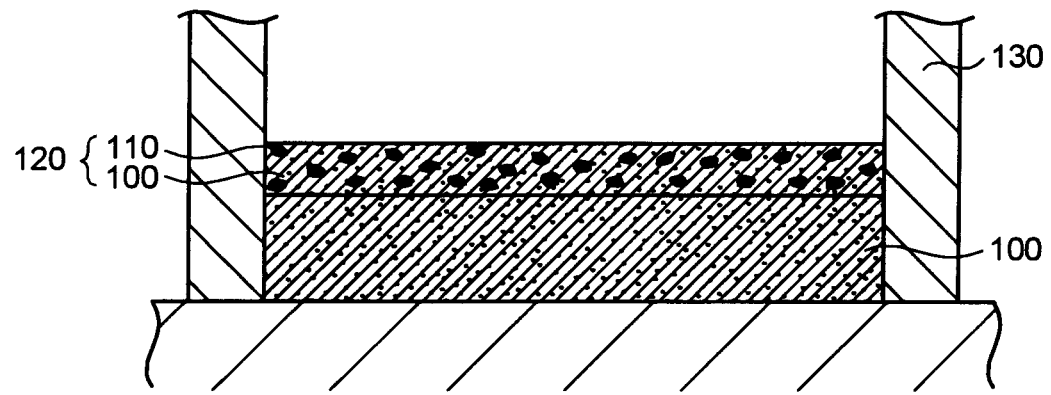
FIG. 2B is a cross-sectional view showing a process of manufacturing the composite bearing member by the first manufacturing method.

Subsequently, as shown in FIG. 2B, a predetermined amount of the first mixed particles 120 to become the metal material containing layer 61 is filled on the resin particle 100 which has been filled.

Figure 2C:
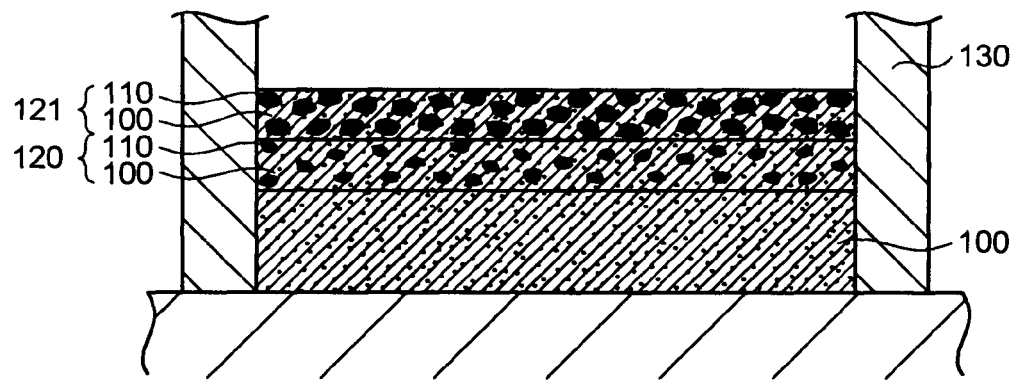
FIG. 2C is a cross-sectional view showing a process of manufacturing the composite bearing member by the first manufacturing method.

Subsequently, as shown in FIG. 2C, a predetermined amount of the second mixed particles 121 to become the metal material containing layer 62 is filled on the first mixed particle 120 which has been filled.

Figure 2D:
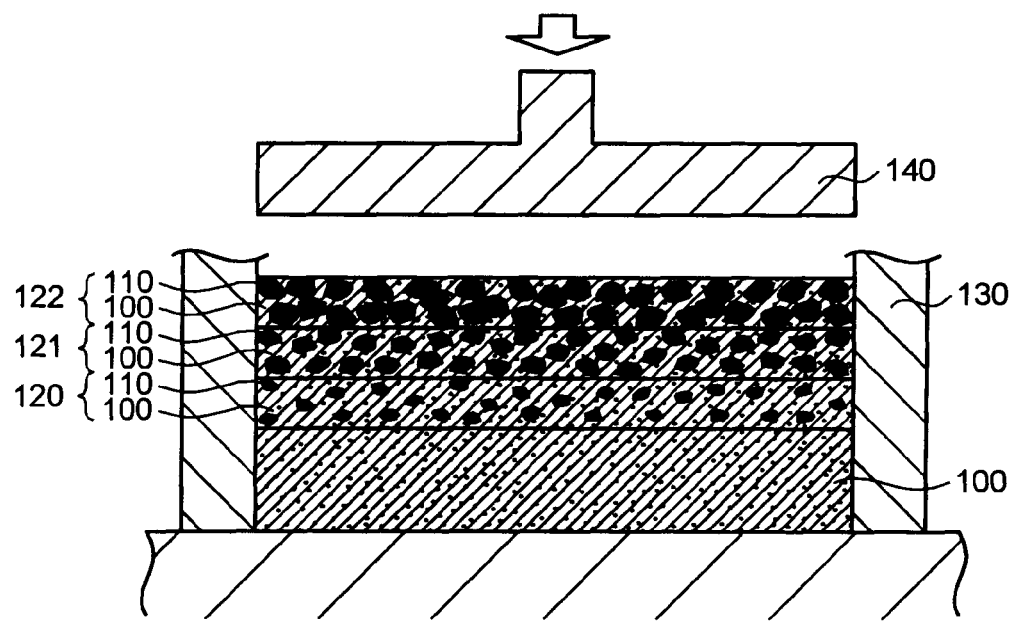
FIG. 2D is a cross-sectional view showing a process of manufacturing the composite bearing member by the first manufacturing method.

Subsequently, as shown in FIG. 2D, a predetermined amount of the third mixed particles 122 to become the metal material containing layer 63 is filled on the second mixed particle 121 which has been filled.

Subsequently, as shown in FIG. 2D, the above-described particles filled into the mold 130 in a stacked manner are pressed, for example, by a press machine 140 or the like in a stack direction and unified.

Subsequently, a formed body unified by pressing is disposed in a manner that a third mixed particle 122 side is an upside, and is heated at a fuse bonding temperature at which the resin particles 100 are fuse bonded to each other for a predetermined time, so that the resin particles are fuse bonded. It should be noted that, on this occasion, since a fusing point of the metal particle 110 is lower than the fuse bonding temperature of the resin particle 100, the metal particle 110 is fused, but the formed body is disposed in a manner that the third mixed particle 122 side is the upside and a surrounding of the formed body is covered by the mold 130, so that the fused metal particle 110 barely flows outside. Further, the respective layers made of the resin particle 100, the first mixed particle 120, the second mixed particle 121, and the third mixed particle 122 are joined by fuse bonding of the resin materials, welding of the metal materials, and fuse bonding of the resin material and the metal material. It should be noted that after being heated at the fuse bonding temperature for the predetermined time, the formed body is cooled to a room temperature.

Here, by the above-described processes, the sliding layer 50 is formed with the layer made only of the resin particle 100. Further, the metal material containing layer 61 is formed with the layer made of the first mixed particle 120, the metal material containing layer 62 is formed with the layer made by the second mixed particle 121, and the metal material containing layer 63 is formed with the layer made of the third mixed particle 122.

Figure 2E:
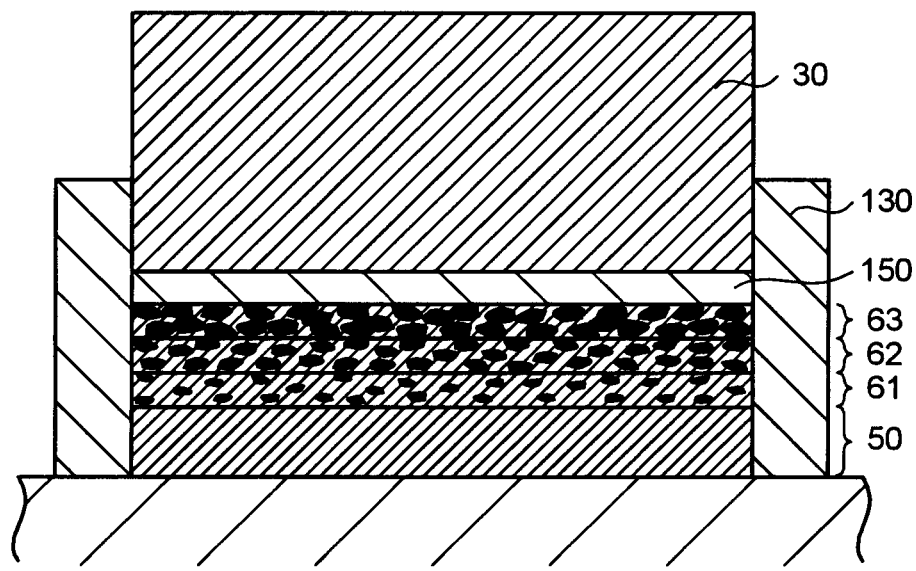
FIG. 2E is a cross-sectional view showing a process of manufacturing the composite bearing member by the first manufacturing method.

Subsequently, as shown in FIG. 2E, a foil-shaped metal member 150 made of a metal material to form an above-described joining layer 40 is disposed on an upper surface of the metal material containing layer 63. Further, a bearing base material 30 is disposed on the metal member 150 in a stacked manner, so that a multi-layered body is constructed.

Subsequently, this multi-layered body is heated at a temperature equal to or higher than the fusing point of the metal particle 110 and the metal member 150 and lower than the fuse bonding temperature at which the resin particles 100 are fuse bonded to each other for a predetermined time. Thereby, the above-described joining between the respective layers of the metal material containing layer 61, the metal material containing layer 62, and the metal material containing layer 63 is made secure, and also the formed body and the bearing base material 30 are joined by the metal member 150.

When joining of the formed body and the bearing base material 30 is performed, in order to make a thickness of the joining layer 40 formed with the metal member 150 be of a predetermined thickness, it is preferable to dispose a spacer made of an iron-based material or the like having the same thickness as the predetermined thickness at an edge between the formed body and the bearing base material 30, for example. Then, after the formed body and the bearing base material 30 are joined, a portion having this spacer is scraped off by cutting or the like.

By going through the above-described processes, there is obtained the composite bearing member 10 which includes the bearing sliding material 20 having the composition graded layer 60 in which the content of the metal material is increased toward the joining layer 40.

(Second Manufacturing Method)

FIG. 3A to FIG. 3G are cross-sectional views showing processes of manufacturing a composite bearing member 10 by the second manufacturing method.

First, a resin particle 100 made of the above-described resin material to constitute a matrix of a bearing sliding material 20 is prepared. It is preferable that an average particle diameter of the resin particle 100 is 0.1 mm to 1 mm, considering an average particle diameter of a granulated particle in a case that the resin particle 100 contains a ceramics fiber or a particle filling material. Further, there is prepared a metal particle 111 made of a first metal material having a fusing point lower than a fuse bonding temperature at which the resin particles 100 are fuse bonded to each other. Here, as the metal particle 111, In (fusing point: 156° C.) or an alloy whose main constituent is In is used. As the alloy whose main constituent is In, for example, In-34 wt % Bi (fusing point: 72° C.) or the like is used. It should noted that, as will be described later, the metal particle 111 is used in order to form a pore for impregnating a second metal material to be contained in a composition graded layer 60.

Here, average particle diameters of the metal particles 111 can be the same or different. It should be noted that the average particle diameter here means a median particle diameter. The average particle diameter is measured by, for example, a laser diffraction particle size distribution measuring method or the like.

Subsequently, three kinds of mixed particles (first mixed particle 125, second mixed particle 126, third mixed particle 127) in which the resin particle 100 and the metal particle 111 are uniformly mixed in a predetermined rate are created. Here, the three kinds of mixed particles are created in a manner that a volume content of the metal particle 111 in the first mixed particle 125 is the smallest and a volume content of the metal particle 111 in the third mixed particle 127 is the largest.

Figure 3A:
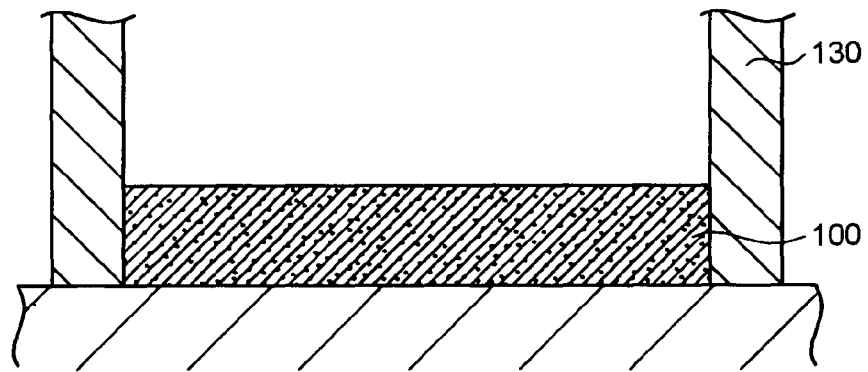
FIG. 3A is a cross-sectional view showing a process of manufacturing a composite bearing member by a second manufacturing method.

First, as shown in FIG. 3A, a predetermined amount of the resin particles 100 to become a sliding layer 50 of the bearing sliding material 20 is filled into a mold 130 of a predetermined shape which is set on a flat surface.

Figure 3B:
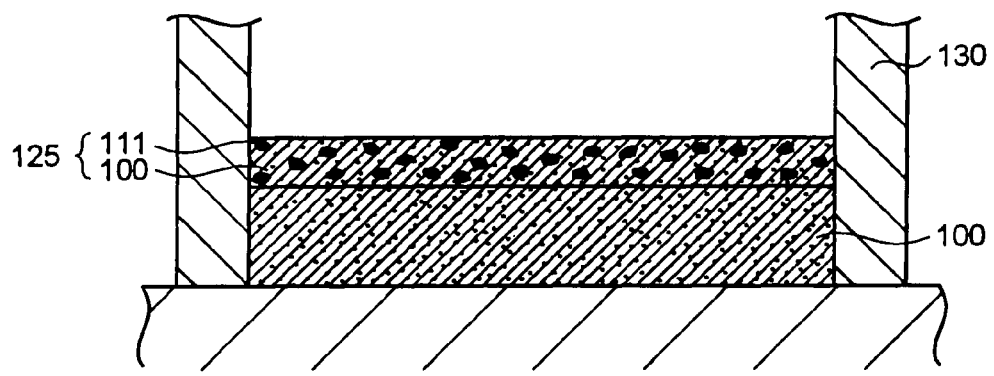
FIG. 3B is a cross-sectional view showing a process of manufacturing the composite bearing member by the second manufacturing method.

Subsequently, as shown in FIG. 3B, a predetermined amount of the first mixed particles 125 to form a metal material containing layer 61 is filled on the resin particle 100 which has been filled.

Figure 3C:
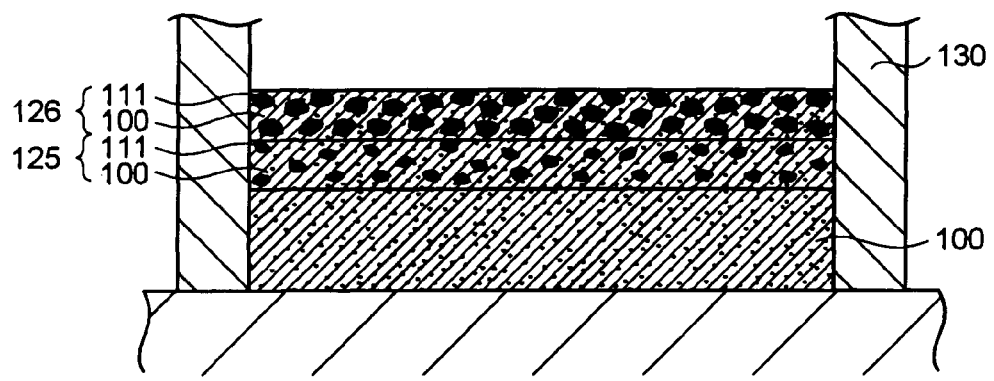
FIG. 3C is a cross-sectional view showing a process of manufacturing the composite bearing member by the second manufacturing method.

Subsequently, as shown in FIG. 3C, a predetermined amount of the second mixed particle 126 to form a metal material containing layer 62 is filled on the first mixed particle 125 which has been filled.

Figure 3D:
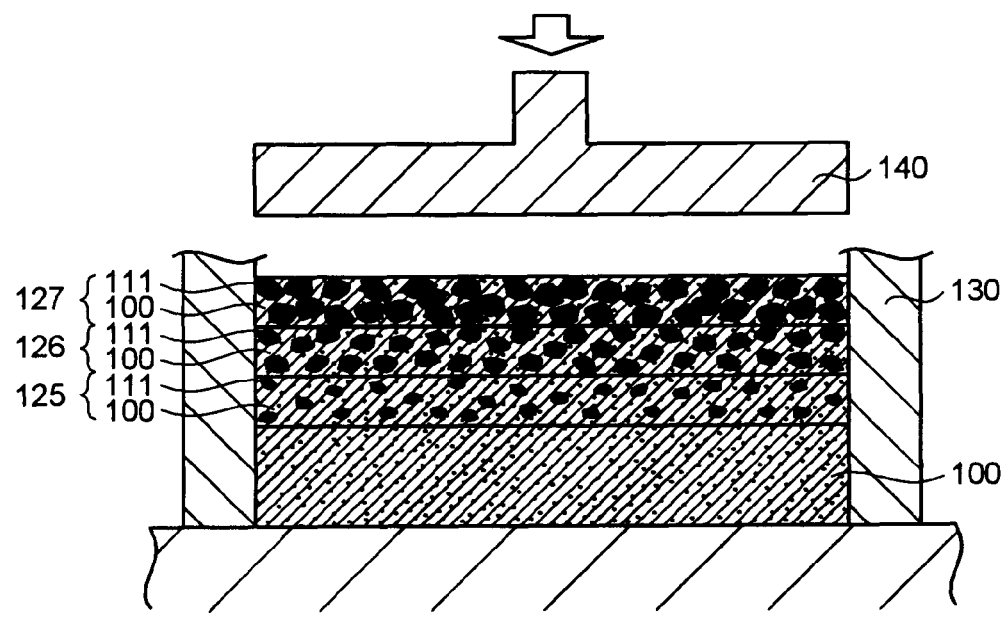
FIG. 3D is a cross-sectional view showing a process of manufacturing the composite bearing member by the second manufacturing method.

Subsequently, as shown in FIG. 3D, a predetermined amount of the third mixed particle 127 to form a metal material containing layer 63 is filled on the second mixed particle 126 which has been filled.

Subsequently, as shown in FIG. 3D, the above-described particles filled into the mold 130 in a stacked manner are pressed, for example, by a press machine 140 or the like in a stack direction and unified.

Figure 3E:
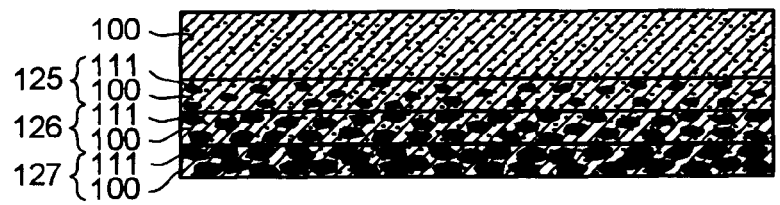
FIG. 3E is a cross-sectional view showing a process of manufacturing the composite bearing member by the second manufacturing method.

Subsequently, as shown in FIG. 3E, a formed body unified by pressing is taken out from the mold 130 and disposed in a manner that a third mixed particle 127 side is a downside, and is heated at the fuse bonding temperature at which the resin particles 100 are fuse bonded to each other for a predetermined time, so that the resin particles are fuse bonded. On this occasion, since the fusing point of the metal particle 111 is lower than the fuse bonding temperature of the resin particle 100, the metal particle 111 is fused and flows outside the formed body. It should be noted that after heated at the fuse bonding temperature for the predetermined time, the formed body is cooled to a room temperature.

Figure 3F:
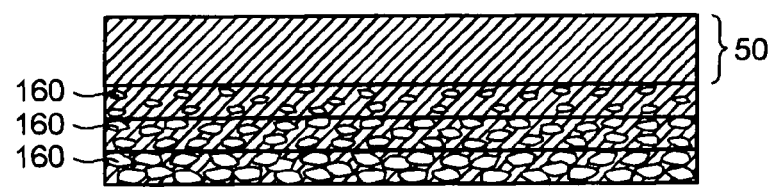
FIG. 3F is a cross-sectional view showing a process of manufacturing the composite bearing member by the second manufacturing method.

In the above-described formed body heated at the fuse bonding temperature for the predetermined time, as shown in FIG. 3F, as a result that the metal particle 111 is fused and flows outside, pores 160 are formed in a portion in which the metal particle 111 has been dispersed. Further, the respective layers made of the resin particle 100, the first mixed particle 125, the second mixed particle 126, and the third mixed particle 127 are joined by fuse bonding of the resin materials. Further, the above processes form the sliding layer 50 with the layer made of only the resin particle 100.

Figure 3G:
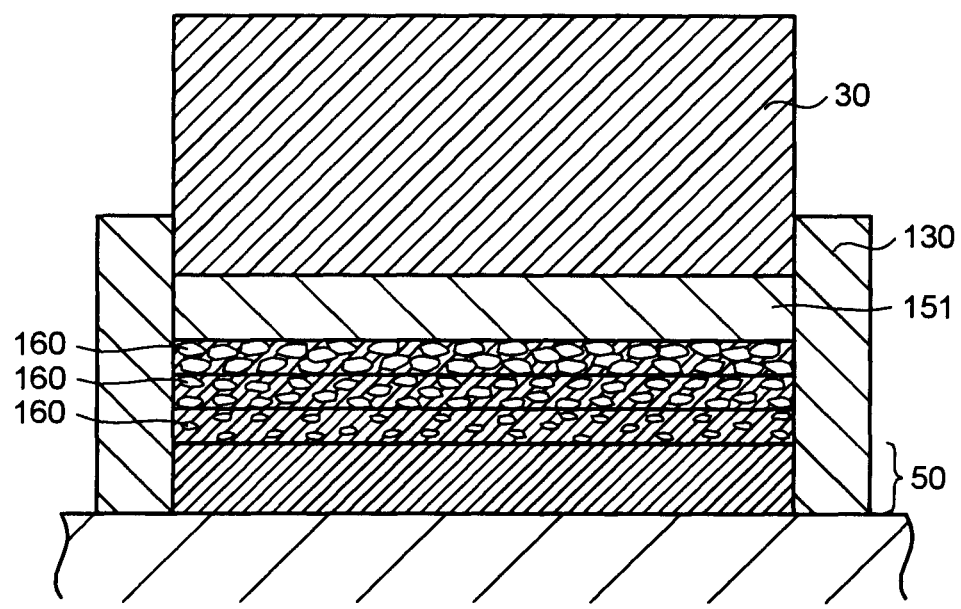
FIG. 3G is a cross-sectional view showing a process of manufacturing the composite bearing member by the second manufacturing method.

Subsequently, as shown in FIG. 3G, the formed body is disposed in a manner that the layer made of the third mixed particle 127 is an upside, and on an upper surface of the layer made of the third mixed particle 127, there is disposed a plate-shaped metal member 151 which is to be a joining layer 40 and is to be a second metal material impregnated into the above-described pores 160 and contained in the composition graded layer 60. Further, on the metal material 151, a bearing base material 30 is disposed in a stacked manner, so that a multi-layered body is constructed. Here, the metal member 151 made of the second metal material is constituted with the same material as the metal material 70 contained in the afore-mentioned composition graded layer 60. It should be noted that the size of the metal member 151, more specifically, a thickness, is set in consideration of an amount impregnated into the pores 160 and an amount to form the joining layer 40.

Subsequently, the mold 130 is attached to a surrounding of this multi-layered body again and the multi-layered body is heated to a temperature equal to or higher than the fusing point of the metal member 151 and lower than the fuse bonding temperature at which the resin particles 100 are fuse bonded to each other for a predetermined time. Thereby, the metal member 151 is fused, and part thereof is impregnated into the pores 160 while the remaining part except a very small quantity flowing outside becomes the joining layer 40 joining the formed body and the bearing base material 30. By impregnation of the metal material 151 into the pores 160, the metal material containing layer 61, the metal material containing layer 62, and the metal material containing layer 63 are formed.

When joining of the formed body and the bearing base material 30 is performed, in order to make a thickness of the joining layer 40 formed with the metal member 151 be of a predetermined thickness, it is preferable to dispose a spacer made of an iron-based material or the like with the same thickness as the predetermined thickness at an edge between the formed body and the bearing base material 30, for example. Then, after the formed body and the bearing base material 30 are joined, a portion having this spacer is scraped off by cutting or the like.

By going through the above-described processes, there is obtained the composite bearing member 10 which includes the bearing sliding material 20 having the composition graded layer 60 in which the content of the metal material is increased toward the joining layer 40.

Next, a bearing device 200 having a composite bearing member 10 of an embodiment according to the present invention will be described.

Figure 4:
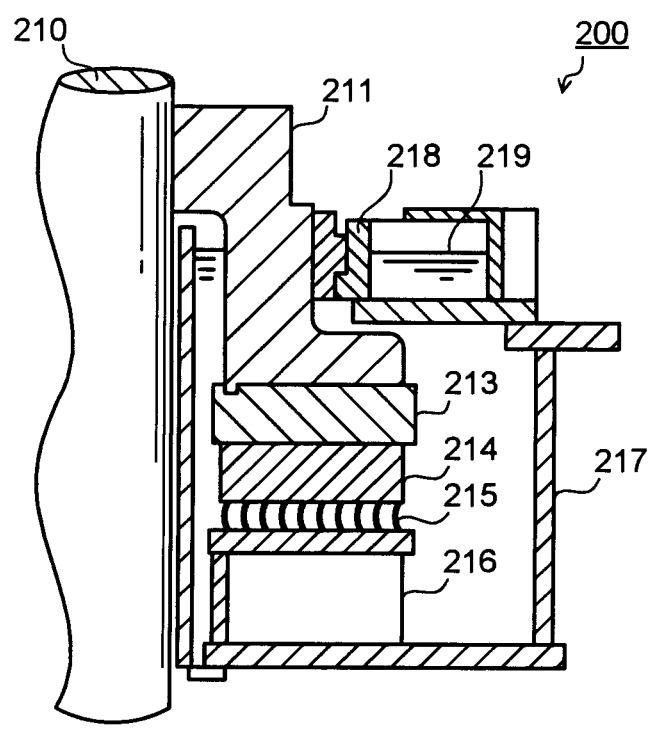
FIG. 4 is a diagram showing a cross section of a bearing device having a composite bearing device of an embodiment of the present invention.

FIG. 4 is a diagram showing a cross section of the bearing device 200 having the composite bearing device 10 of the embodiment of the present invention. Here, with a thrust bearing used for a water turbine generator being cited as an example, a structure of a thrust bearing which is conventionally used widely for a rotary electrical machine or the like will be described.

As shown in FIG. 4, a thrust collar 211 is attached to a rotary shaft 210, and a rotary plate 213 is provided on a lower surface of the thrust collar 211. A plurality of stationary plates 214 formed in fan shapes is disposed radially around the rotary shaft 210 and slidably supports the rotary plate 213. The stationary plate 214 has a constitution of the composite bearing member 10.

Further, the stationary plate 214 is supported by a support plate 216 via an elastic member 215 such as a plurality of springs. Further, on a side surface of the thrust collar 211, a guide bearing 217 is attached. The guide bearing 217 has the constitution of the composite bearing member 10. An oil tank 218 is provided outside the guide bearing 217, and the inside of the oil tank 218 is filled with lubricant oil 219.

As stated above, the composite bearing member 10 of the embodiment according to the present invention can be applied to a bearing device or the like. It should be noted that the device to which the composite bearing member 10 is applied is not limited to the device having the above-described constitution, but the composite bearing member 10 can be applied to a device which includes a bearing member having a sliding surface on which a rotating portion is slided, such as, for example, a diesel engine for ship, a steam turbine to produce power, a gas turbine, a general industrial liquid/air pressure device, and a plant facility.

As described above, according to the composite bearing member 10 of the embodiment according to the present invention, as a result of making the layers except the sliding layer 50 in the bearing sliding material 20 be the composition graded layer 60 which dispersedly contains the metal material and in which the content of the metal material is increased toward the joining later 40, the thermal stress due to a difference of the coefficients of linear expansion in the bearing sliding material 20 and the joining layer 40 can be alleviated. Thereby, a bearing material having a superior joining strength and high reliability can be obtained.

Further, as a result that the matrix constituting the bearing sliding material 20 is constituted with the resin material having the fuse bonding temperature higher than the fusing point of the metal material contained in the composition graded layer 60, fusing or deterioration of the bearing sliding material 20 does not occur even when heating is performed to a temperature equal to or higher than the fusing point of the metal material and lower than the fuse bonding temperature of the resin material. Therefore, it is possible to join the bearing sliding material 20 and the bearing base material 30 properly with a superior joining strength via the joining layer 40.

Besides, in the bearing device 20 having the composite bearing member 10 of the embodiment according to the present invention, similar operation and effect to those in the above-described composite bearing member 10 can be obtained, so that a bearing device having high reliability can be obtained.

Further, according to the manufacturing method of the composite bearing member 10 of the embodiment according to the present invention, a vacuum facility, for example, is unnecessary and the composite bearing member 10 can be manufactured by a simple method without deteriorating performance and reliability of the bearing member. Thus, a manufacturing cost for manufacturing a composite bearing member can be decreased.

Next, it will be explained that the composite bearing member 10 according to the present invention has a superior joining strength, by using a practical example and a comparison example.

Practical Example 1

In Practical Example 1, a composite bearing member 10 created by a similar manufacturing method to the first manufacturing method shown in FIG. 2A to FIG. 2E was used.

Hereinafter, the manufacturing method of the composite bearing member 10 used in Practical Example 1 will be described with reference to FIG. 2A to FIG. 2E.

First, a resin particle 100 having an average particle diameter of 5 µm made of a PTFE resin was prepared. It should be noted that the average particle diameter means a median particle. This average particle diameter was measured by a laser diffraction particle size distribution measuring method. Hereinafter, meaning of an average particle diameter and a measuring method thereof are the same as those described above.

Further, there was prepared a metal particle 110 made of Sn-0.5 wt % Cu-3.0 wt % Ag to be contained in a composition graded layer 60. Here, an average particle diameter of the metal particle 110 for forming a metal material containing layer 61 was 25 µm, an average particle diameter of the metal particle 110 for forming a metal material containing layer 62 was 50 µm, and an average particle diameter of the metal particle 110 for forming a metal material containing layer 63 was 75 µm.

Subsequently, in order to form the metal material containing layers 61, 62, 63, three kinds of mixed particles (first mixed particle 120, second mixed particle 121, third mixed particle 122) in which the resin particle 100 and the metal particle 110 were uniformly mixed in a predetermined rate were created. Here, the metal material containing layer 61 was formed with the first mixed particle 120, the metal material containing layer 62 was formed with the second mixed particle 121, and the metal material containing layer 63 was formed with the third mixed particle 122. Here, volume ratios (volume of metal particle 110:volume of resin particle 100) of the metal particle 110 and the resin particle 100 were 25:75 in the first mixed particle 120, 50:50 in the second mixed particle 121, and 75:25 in the third mixed particle 122.

First, as shown in FIG. 2A, a predetermined amount of the resin particles 100 to become a sliding layer 50 of a bearing sliding material 20 was filled into a square mold 130 of 300 mm×300 mm disposed on a flat surface.

Subsequently, as shown in FIG. 2B, a predetermined amount of the first mixed particles 120 to become the metal material containing layer 61 was filled on the resin particle 100 which had been filled.

Subsequently, as shown in FIG. 2C, a predetermined amount of the second mixed particles 121 to become the metal material containing layer 62 is filled on the first mixed particle 120 which has been filled.

Subsequently, as shown in FIG. 2D, a predetermined amount of the third mixed particles 122 to become the metal material containing layer 63 was filled on the second mixed particle 121 which had been filled.

Subsequently, as shown in FIG. 2D, the above-described particles filled into the mold 130 in a stacked manner were pressed by a press machine 140 at a pressure of 50 MPa in a stack direction and unified. Thus, a formed body was created in which a thickness of the layer made of the resin particle 100 was 2 mm and thicknesses of the layers of the respective mixed particles were 1 mm, respectively.

Subsequently, the formed body unified by pressing was disposed in a manner that a third mixed particle 122 side was an upside, and was heated at 375° C. being a fuse bonding temperature at which the resin particles 100 were fuse bonded to each other for one hour, so that the resin particles were fuse bonded. It should be noted that, on this occasion, since a fusing point of the metal particle 110 is lower than a fuse bonding temperature of the resin particle 100, the metal particle 110 was fused, but the formed body was disposed in a manner that the third mixed particle 122 side was the upside and a surrounding of the formed body was covered by the mold 130, so that the fused metal particle 110 barely flowed outside. After being heated at the fuse bonding temperature for a predetermined time, the formed body was cooled to a room temperature.

Here, by the above-described processes, the sliding layer 50 was formed with the layer made of only the resin particle 100. Further, the metal material containing layer 61 was formed with the layer made of the first mixed particle 120, the metal material containing layer 62 was formed with the layer made by the second mixed particle 121, and the metal material containing layer 63 was formed with the layer made of the third mixed particle 122.

Subsequently, as shown in FIG. 2E, a foil-shaped metal member 150 with a thickness of 0.2 mm, a width of 300 mm and a length of 300 mm constituted with Sn-0.5 wt % Cu-0.3 wt % Ag to become a joining layer 40 was disposed on an upper surface of the metal material containing layer 63. Here, the metal member 150 was constituted with the same material as that of the metal particle 110. Further, the bearing base material 30 made of structural carbon steel (S45C) with a thickness of 50 mm, a width of 300 mm and a length of 300 mm was disposed on the metal member 150 in a stacked manner, so that a multi-layered body was constructed.

Subsequently, this multi-layered body was heated at 250° C. being a temperature equal to or higher than the fusing point of the metal particle 110 and lower than the fuse bonding temperature at which the resin particles 100 are fuse bonded to each other for three minutes. Thereby, the above-described joining between the respective layers of the metal material containing layer 61, the metal material containing layer 62, and the metal material containing layer 63 was made secure, and also the formed body and the bearing base material 30 were joined by the metal member 150. A thickness of the joining layer 40 was 0.2 mm.

When joining of the formed body and the bearing base material 30 was performed, in order to remove an oxide film on a surface of the bearing base material 30, flux was applied on the surface of the bearing base material 30 before heating. Further, in order to make the thickness of the joining layer 40 formed with the metal member 150 be 0.2 mm, a spacer made of an aluminum-based material (6061A1 alloy) with a thickness of 0.2 mm was disposed at an edge between the formed body and the bearing base material 30. Then, after the formed body and the bearing base material 30 were joined, a portion having this spacer was scraped off by cutting.

Figure 5:
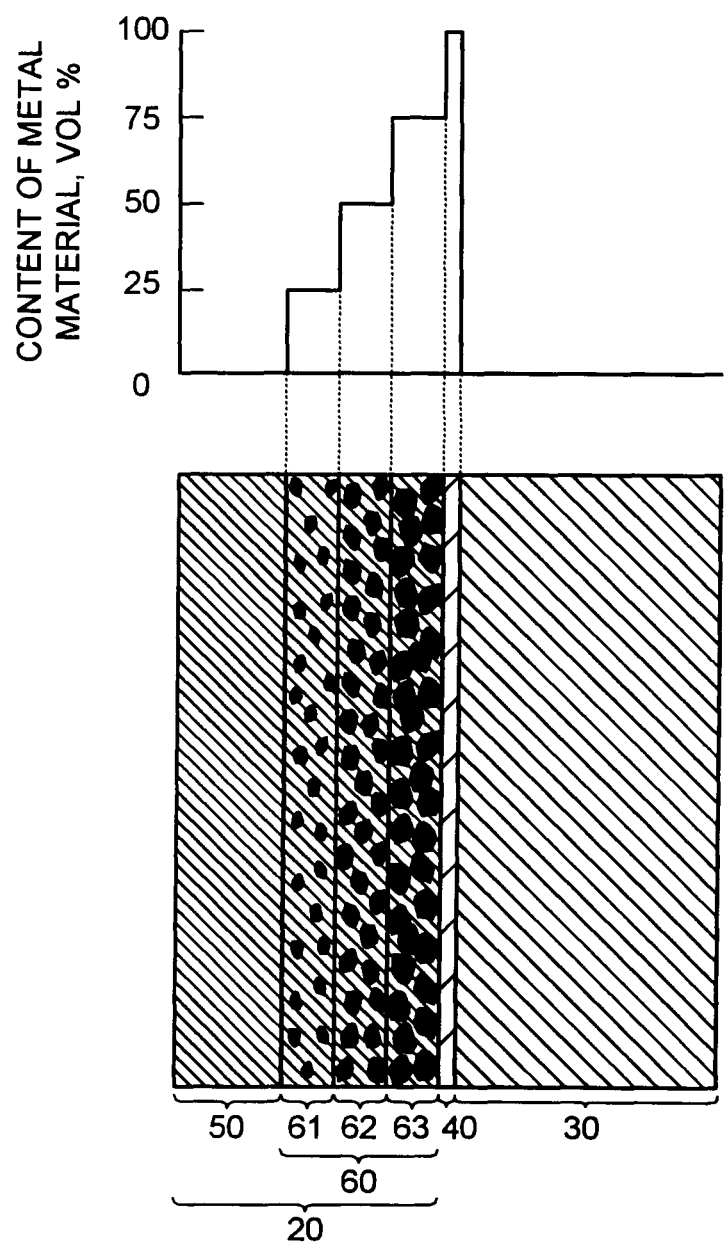
FIG. 5 is a diagram schematically showing a volume content of a metal material contained in each layer of composite bearing members created in Practical Example 1 and Practical Example 2.

Here, FIG. 5 is a diagram schematically showing a volume content of the metal material contained in each layer of the composite bearing member 10 created by going through the above-described processes.

By going through the above-described processes, as shown in FIG. 5, there was obtained the composite bearing member 10 which included the bearing sliding material 20 having the composition graded layer 60 in which a content of the metal material (Sn-0.5 wt % Cu-0.3 wt % Ag) was increased toward the joining layer 40.

Next, in order to evaluate a shear strength of a joining interface of the obtained composite bearing member 10, a shear test was performed by using the composite bearing member 10 under a condition of a tensile speed of 0.1 mm/second parallelly to the joining interface.

A result of the shear test showed that the shear strength was 20 MPa. This shear strength sufficiently fulfilled a shear strength (10 MPa) required of a bearing material.

Practical Example 2

In Practical Example 2, a composite bearing member 10 created by a similar manufacturing method to the second manufacturing method shown in FIG. 3A to FIG. 3G was used.

Hereinafter, the manufacturing method of the composite bearing member 10 used in Practical Example 2 will be described with reference to FIG. 3A to FIG. 3G.

First, a resin particle 100 having an average particle diameter of 5 μm made of a PTFE resin was prepared. Further, a metal particle 111 made a first metal material having a fusing point lower than a fuse bonding temperature at which the resin particles 100 are fuse bonded was prepared. The metal particle 111 was used in order to form a pore for impregnating a second metal material to be contained in a composition graded layer 60.

Here, an average particle diameter of the metal particle 111 for forming a metal material containing layer 61 was 25 μm, an average particle diameter of the metal particle 111 for forming a metal material containing layer 62 was 50 μm, and an average particle diameter of the metal particle 111 for forming a metal material containing layer 63 was 75 μm.

Subsequently, three kinds of mixed particles (first mixed particle 125, second mixed particle 126, third mixed particle 127) in which the resin particle 100 and the metal particle 111 were uniformly mixed in a predetermined rate, for forming the metal material containing layers 61, 62, 63, were created. Here, the metal material containing layer 61 was formed with the first mixed particle 125, the metal material containing layer 62 was formed with the second mixed particle 126, and the metal material containing layer 63 was formed with the third mixed particle 127. Here, volume ratios (volume of metal particle 111:volume of resin particle 100) of the metal particle 111 and the resin particle 100 were 25:75 in the first mixed particle 125, 50:50 in the second mixed particle 126, and 75:25 in the third mixed particle 127.

First, as shown in FIG. 3A, a predetermined amount of the resin particles 100 to become a sliding layer 50 of a bearing sliding material 20 was filled into a square mold 130 of 300 mm×300 mm disposed on a flat surface.

Subsequently, as shown in FIG. 3B, a predetermined amount of the first mixed particles 125 for forming the metal material containing layer 61 was filled on the resin particle 100 which had been filled.

Subsequently, as shown in FIG. 3C, a predetermined amount of the second mixed particles 126 for forming the metal material containing layer 62 was filled on the first mixed particle 125 which had been filled.

Subsequently, as shown in FIG. 3D, a predetermined amount of the third mixed particles 127 for forming the metal material containing layer 63 was filled on the second mixed particle 126 which had been filled.

Subsequently, as shown in FIG. 3D, the above-described particles filled into the mold 130 in a stacked manner were pressed by a press machine 140 at a pressure of 50 MPa in a stack direction and unified. Thus, a formed body was created in which a thickness of the layer made of the resin particle 100 was 2 mm and thicknesses of the layers of the respective mixed particles were 1 mm, respectively.

Subsequently, as shown in FIG. 3E, the formed body unified by pressing was taken out from the mold 130 and disposed in a manner that a third mixed particle 127 side was a downside, and was heated at 375° C. being a fuse bonding temperature at which the resin particles 100 are fuse bonded to each other for one hour, so that the resin particles were fuse bonded. On this occasion, since the fusing point of the metal particle 111 is lower than the fuse bonding temperature of the resin particle 100, the metal particle 111 was fused and flowed outside the formed body. It should be noted that after heated at the fuse bonding temperature for a predetermined time, the formed body was cooled to a room temperature.

In the formed body heated at 375° C. being the above-described fuse bonding temperature for one hour, as shown in FIG. 3F, as a result that the metal particle 111 was fused and flowed outside, pores 160 were formed in a portion in which the metal particle 111 had been dispersed. Besides, the above processes formed a sliding layer 50 with a layer made of only the resin particle 100.

Subsequently, as shown in FIG. 3G, the formed body was disposed in a manner that the layer made of the third mixed particle 127 was an upside, and on an upper surface of the layer made of the third mixed particle 127, there was disposed a plate-shaped metal member 151 made of Sn-0.7 wt % Cu which is to become a joining layer 40 and is to become a second metal material impregnated into the above-described pores 160 and contained in the composition graded layer 60. A thickness of the metal member 151 was 1.8 mm, a width thereof was 300 mm, and a length thereof was 300 mm. Further, a bearing base material 30 made of structural carbon steel (C45C) with a thickness of 50 mm, a width of 300 mm and a length of 300 mm was disposed on the metal member 151 in a stacked manner, so that a multi-layered body was constructed.

Subsequently, the mold 130 was attached to a surrounding of this multi-layered body again and the multi-layered body was heated at 250° C. being a temperature equal to or higher than a fusing point of the metal member 151 and lower than the fuse bonding temperature at which the resin particles 100 are fuse bonded to each other for three minutes. Thereby, the metal member 151 was fused, and part thereof was impregnated into the pores 160 while the remaining part except a very small quantity flowing outside became the joining layer 40 joining the formed body and the bearing base material 30. By impregnation of the metal material 151 into the pores 160, the metal material containing layer 61, the metal material containing layer 62, and the metal material containing layer 63 were formed.

When joining of the formed body and the bearing base material 30 was performed, in order to remove an oxide film on a surface of the bearing base material 30, flux was applied on the surface of the bearing base material 30 before heating. Further, in order to make a thickness of the joining layer 40 formed with the metal member 151 be 0.2 mm, a spacer made of an aluminum-based material (6061A1 alloy) with a thickness of 0.2 mm was disposed at an edge between the formed body and the bearing base material 30. Then, after the formed body and the bearing base material 30 were joined, a portion having this spacer was scraped off by cutting.

By going through the above-described processes, as shown in FIG. 5, there was obtained the composite bearing member 10 which included the bearing sliding material 20 having the composition graded layer 60 in which the content of the metal material (Sn-0.7 wt % Cu) was increased toward the joining layer 40.

Next, on the obtained composite bearing member 10, a shear test was performed by the same method as the shear test performed in Practical Example 1.

A result of the shear test showed that the shear strength was 20 MPa. This shear strength sufficiently fulfilled a shear strength (10 MPa) required of a bearing material.

Comparison Example 1

In Comparison Example 1, there was used a composite bearing member with a constitution which did not have a metal material containing layer 61 nor a metal material containing layer 62 in the composite bearing member 10 used in Practical Example 1. In other words, a bearing sliding material of the composite bearing member used in Comparison Example 1 was constituted with a sliding layer 50 and a metal material containing layer 63, and did not have a composition graded layer. The constitution other than the above was the same as that of the composite bearing member 10 used in Practical Example 1. Further, the composite bearing member used in Comparison Example 1 was created by processes excluding the processes of forming the metal material containing layer 61 and the metal material containing layer 62 in the manufacturing processes of the composite bearing member 10 used in Practical Example 1. In other words, the composite bearing member used in Comparison Example 1 was created by the same manufacturing processes as the manufacturing processes (including a condition of a material and the like) of the composite bearing member 10 used in Practical Example 1, excepted that the above-described processes were excluded.

Figure 6:
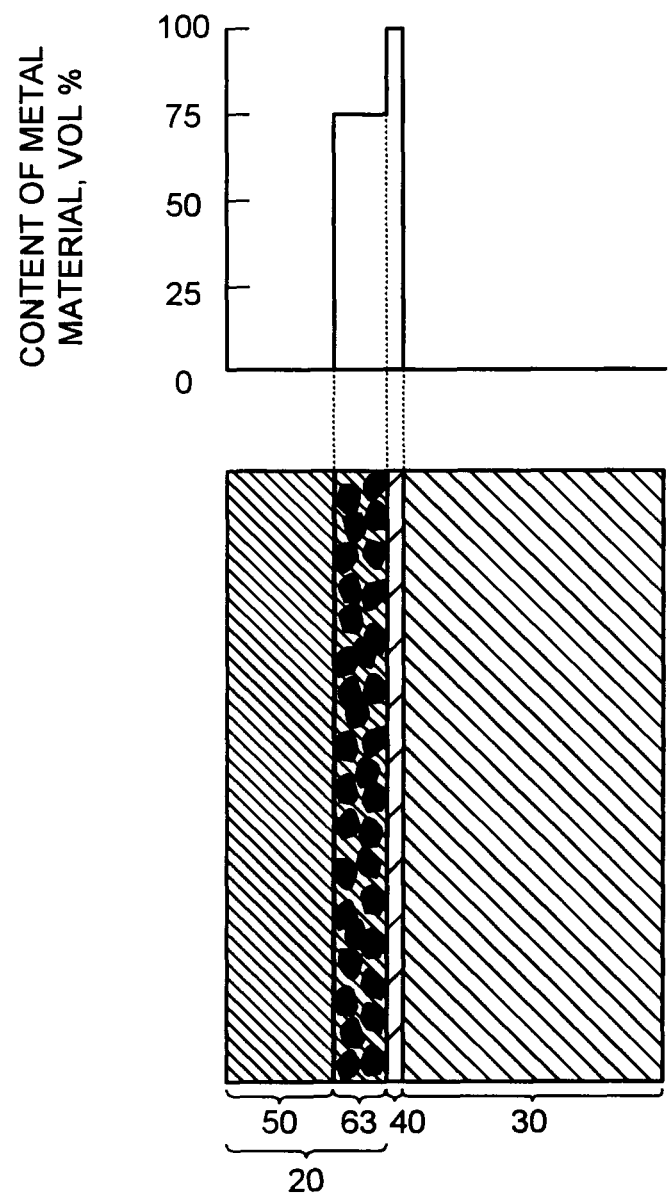
FIG. 6 is a diagram schematically showing a volume content of a metal material (Sn-0.5 wt % Cu-3.0 wt % Ag) contained in each layer of a composite bearing member created in Comparison Example 1.

Here, FIG. 6 is a diagram schematically showing a volume content of a metal material (Sn-0.5 wt % Cu-3.0 wt % Ag) contained in each layer of the composite bearing member created in Comparison Example 1.

As shown in FIG. 6, the composite bearing member created in Comparison Example 1 was constituted with a bearing sliding material 20 having the sliding layer 50 and the metal material containing layer 63, a bearing base material 30, and a joining layer 40 joining the bearing sliding material 20 and the bearing base material 30.

However, in the created composite bearing member, peeling had occurred in an edge portion between the sliding layer 50 and the metal material containing layer 63, and a sound composite bearing member had not been able to be obtained. It is considered that when cooling a formed body to a room temperature after the formed body was heated at 375° C. being a fuse bonding temperature at which resin particles 100 are fuse bonded to each other for one hour and the resin particles were fuse bonded, a difference in coefficients of linear expansion between the sliding layer 50 and the metal material containing layer 63 become large due to acute composition change therebetween, and as a result, peeling occurred in the edge portion between the sliding layer 50 and the metal material containing layer 63.

Comparison Example 2

In Comparison Example 2, there was used a composite bearing member with a constitution which did not have a metal material containing layer 61, a metal material containing layer 62 nor a metal material containing layer 63 in the composite bearing member 10 used in Practical Example 1. In other words, a bearing sliding material of the composite bearing member used in Comparison Example 2 was constituted with only a sliding layer 50, and did not have a composition graded layer. The constitution other than the above was the same as that of the composite bearing member 10 used in Practical Example 1. Further, the composite bearing member used in Comparison Example 2 was created by processes excluding the processes of forming the metal material containing layer 61, the metal material containing layer 62 and the metal material containing layer 63 in the manufacturing processes of the composite bearing member 10 used in Practical Example 1. In other words, the composite bearing member used in Comparison Example 2 was created by the same manufacturing processes as the manufacturing processes (including a condition of a material and the like) of the composite bearing member 10 used in Practical Example 1, excepted that the above-described processes were excluded.

Figure 7:
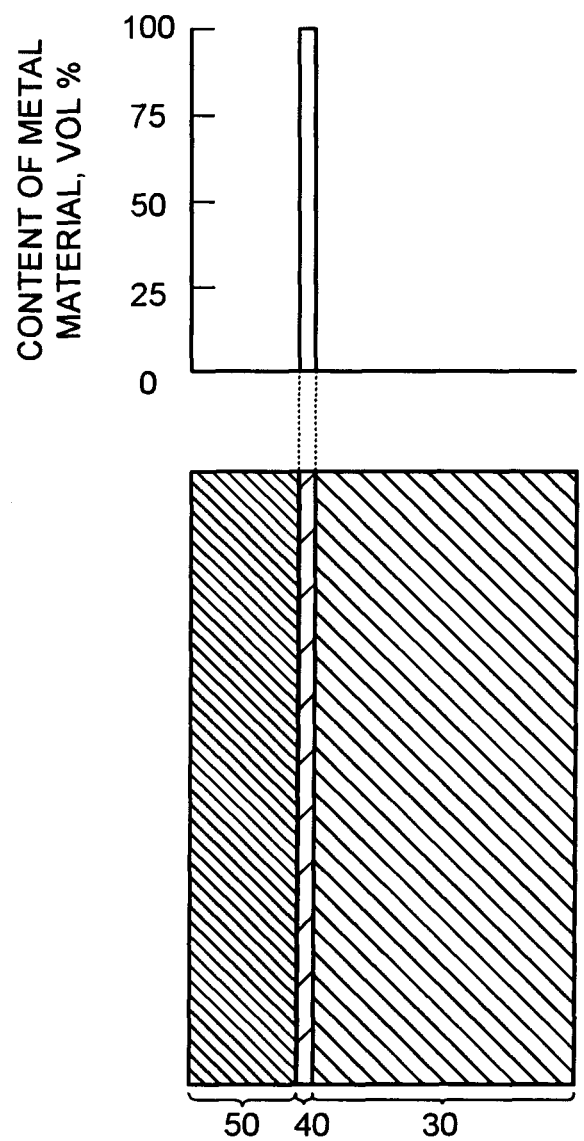
FIG. 7 is a diagram schematically showing a volume content of a metal material (Sn-0.5 wt % Cu-3.0 wt % Ag) contained in each layer of a composite bearing member created in Comparison Example 2.

Here, FIG. 7 is a diagram schematically showing a volume content of a metal material (Sn-0.5 wt % Cu-3.0 wt % Ag) contained in each layer of a composite bearing member created in Comparison Example 2.

As shown in FIG. 7, the composite bearing member created in Comparison Example 2 was constituted with a bearing sliding material 20 having the sliding layer 50, a bearing base material 30, and a joining layer 40 joining the bearing sliding material 20 and the bearing base material 30.

However, in the created composite bearing member, an entire surface of a joining surface between the sliding layer 50 and the joining layer 40 peeled, and a sound composite bearing member had not been able to be obtained. It is considered that when cooling a formed body to a room temperature after the formed body was heated at 375° C. being a fuse bonding temperature at which resin particles 100 are fuse bonded to each other for one hour and the resin particles were fuse bonded, a difference in coefficients of linear expansion between the sliding layer 50 and the joining layer 40 became large due to acute composition change therebetween, and as a result, the entire surface of the joining surface between the sliding layer 50 and the joining layer 40 peeled.

Hereinabove, the present invention is concretely described in accordance with an embodiment, but the present invention is not limited to the above embodiment and can be modified without departing from the spirit or scope of the general inventive concept.

What is claimed is:

1. A composite bearing member, comprising:
a bearing sliding material having a sliding layer sliding a rotating portion on one surface;
a bearing base material made of a material different from a material constituting the bearing sliding material; and
a joining layer joining the other surface of the bearing sliding material and one surface of the bearing base material,
wherein a layer constituting the bearing sliding material between the sliding layer and the joining layer is a composition graded layer which dispersedly contains a metal material and in which a content of the metal material is increased toward the joining layer.

2. The composite bearing member as set forth in claim 1, wherein a matrix constituting the bearing sliding material is a resin material having a fuse bonding temperature higher than a fusing point of the metal material.

3. The composite bearing member as set forth in claim 1, wherein the bearing base material is made of an iron-based material.

4. The composite bearing member as set forth in claim 1, wherein the metal material is made of tin (Sn) or an alloy whose main constituent is tin (Sn).

5. A bearing device, comprising:
a thrust bearing slidably supporting a thrust load in a shaft direction of a rotary shaft; and
a guide bearing slidably supporting shaft shaking in a rotational direction,
wherein at least one of bearing members in the thrust bearing and the guide bearing is constituted with a composite bearing member as set forth in claim 1.

6. A rotary electrical machine, comprising,
a bearing device as set forth in claim 5.

* * * * *